(12) United States Patent
Goto

(10) Patent No.: US 7,921,765 B2
(45) Date of Patent: Apr. 12, 2011

(54) PISTON FOR AUTOMATIC TRANSMISSION

(75) Inventor: Kiichiro Goto, Fukushima (JP)

(73) Assignee: NOK Corporation (JP)

( * ) Notice: Subject to any disclaimer, the term of this patent is extended or adjusted under 35 U.S.C. 154(b) by 490 days.

(21) Appl. No.: 12/080,581

(22) Filed: Apr. 3, 2008

(65) Prior Publication Data

US 2008/0245225 A1   Oct. 9, 2008

(30) Foreign Application Priority Data

Apr. 4, 2007   (JP) ................. 2007-097920

(51) Int. Cl.
*F01B 31/00* (2006.01)
*F16J 9/00* (2006.01)
(52) U.S. Cl. .......................... 92/107; 92/240
(58) Field of Classification Search ............ 92/107, 92/240; 192/85.25, 85.44
See application file for complete search history.

(56) References Cited

U.S. PATENT DOCUMENTS

| 5,172,799 | A  | * | 12/1992 | Iijima et al. | ............. | 192/85.25 |
| 6,193,042 | B1 | * | 2/2001  | Kempf et al. | ............. | 192/85.25 |
| 7,040,474 | B2 | * | 5/2006  | Pedersen et al. | .......... | 192/85.25 |

FOREIGN PATENT DOCUMENTS

JP   2004-060750   2/2004

* cited by examiner

*Primary Examiner* — Michael Leslie
(74) *Attorney, Agent, or Firm* — Harness, Dickey & Pierce, P.L.C.

(57) ABSTRACT

To prevent effects of small amplitude oscillations caused by pressure fluctuation, eccentric attachment of a cancel plate and biased load application of a return spring, and to achieve a long service life of the inner peripheral seal portion, a BPS (1) with a piston member (20) moving in an axial direction inside a cylinder (10) and defining a compression chamber (M) together with the cylinder (10) and a cancel plate (30) opposing to a bottom portion (11) of the cylinder (10) beyond the piston member (20) is provided with an inner peripheral seal portion (50) with a seal lip (52) slidably contacting an inner peripheral tube portion (13) of the cylinder (10) and a fitting portion (53) fitted to the inner peripheral tube portion (13) in an inner peripheral end portion (35) of the cancel plate (30).

2 Claims, 4 Drawing Sheets

PISTON FOR AUTOMATIC TRANSMISSION

BACKGROUND OF THE INVENTION

1. Field of the Invention

The present invention relates to a piston for an automatic transmission (hereinafter, refer to as "BPS") used for coupling a clutch in the automatic transmission of a motor vehicle. More particularly, the present invention relates to a structure of an inner peripheral seal portion arranged in a cancel plate of the BPS.

2. Description of the Conventional Art

Conventionally, a BPS 100 used for coupling a clutch in an automatic transmission such as an AT, a CVT and the like for a motor vehicle is provided with a piston member 110 moving in an axial direction in an inner portion of a closed-end cylindrical cylinder 101 and defining a compression chamber M together with the cylinder 101, a cancel plate 120 opposing to a bottom portion 102 of the cylinder 101 beyond the piston member 110 and defining a balance oil chamber N together with the piston member 110 and the cylinder 101, and a return spring 130 functioning such as to push back the piston member 110 which is pushed down by the compression chamber M being pressurized, as shown in FIG. 3, and only an outer peripheral seal portion 121 is arranged at an outer peripheral side of the cancel plate 120 for retaining a centrifugal hydraulic pressure.

In other words, since the cancel plate 120 is provided with only the outer peripheral seal portion 121, and is not sealed at an inner peripheral side, the centrifugal hydraulic pressure of the balance oil chamber N becomes small in comparison with the centrifugal hydraulic pressure of the compression chamber M, and it is impossible to effectively cancel the centrifugal hydraulic pressure of the compression chamber M at a time of cancelling the coupling of the clutch. Therefore, as shown in FIG. 4, there has been structured such as to increase the centrifugal hydraulic pressure of the balance oil chamber N by arranging an inner peripheral seal portion 123 constituted by a seal lip 122 which is in close contact with the inner peripheral tube portion 103 of the cylinder 101, on an end portion 124 at an inner peripheral side of the cancel plate 120, so as to secure a sealing performance of the balance oil chamber and improve a shift response.

However, since it is necessary for the inner peripheral seal portion 123 arranged on the inner peripheral side end portion 124 to absorb a play in a diametrical direction of the cancel plate 120 by the seal lip 122, there is a risk that an abrasion of the seal lip 122 is promoted so that the hydraulic pressure cannot be retained, in the case that a small amplitude oscillation is generated on the basis of a pressure fluctuation. Further, in the case that an inclination or the like is generated by eccentric attachment of the cancel plate 120 or a biased load application of the return spring 130, the seal lip 122 is pressed in one direction. As a result, a biased abrasion or a lack of an eccentricity following characteristic is generated in the seal lip 122, and there is a risk that the hydraulic pressure cannot be retained by the inner peripheral seal portion 123.

In this connection, Japanese Unexamined Patent Publication No. 2004-060750 discloses a structure which prevents an operating fluid from leaking and prevents an abrasion powder from making an intrusion by installing a seal member of a rubber-like elastic material for sealing a fitting surface between a cancel plate and an inner peripheral tube portion of a housing to an inner peripheral portion of the cancel plate while compressing the seal member in a state of having a predetermined fastening margin, for the purpose of shortening an axial dimension so as to downsize a clutch apparatus.

However, the disclosed invention has a different object from an object of the present invention.

SUMMARY OF THE INVENTION

Problem to be Solved by the Invention

The present invention is made for the purpose of solving the problem mentioned above, and an object of the present invention is to prevent a seal lip of an inner peripheral seal portion arranged on an inner peripheral end portion of a cancel plate of a BPS from wearing early due to a small amplitude oscillation caused by pressure fluctuation, eccentric attachment of the cancel plate and biased load application of a return spring, and thereby to achieve a long service life of the inner peripheral seal portion.

Means for Solving the Problem

In order to achieve the object mentioned above, in accordance with a first aspect of the present invention, there is provided a BPS comprising:

a piston member moving in an axial direction in an inner portion of a closed-end cylindrical cylinder and defining a compression chamber together with the cylinder;

a cancel plate opposing to a bottom portion of the cylinder beyond the piston member and defining a balance oil chamber together with the piston member and the cylinder; and a return spring functioning such as to push back the piston member which is pushed down by the compression chamber being pressurized, wherein an inner peripheral seal portion includes a seal lip which is in close contact with an inner peripheral tube portion of the cylinder and a fitting portion fitted to the inner peripheral tube portion. The inner peripheral seal portion is formed by a rubber-like elastic material and arranged on an inner peripheral end portion of the cancel plate.

Further, in accordance with a second aspect of the present invention, there is provided the BPS as recited in the first aspect, wherein slits are formed on an inner peripheral surface of the fitting portion of the inner peripheral seal portion.

Effect of the Invention

The present invention achieves the following effects.

Since the BPS in accordance with the first aspect of the present invention provided with the structure mentioned above is structured such that the inner peripheral seal portion including the seal lip which is in close contact with the inner peripheral tube portion of the cylinder and the fitting portion fitted to the inner peripheral tube portion of the cylinder. The inner peripheral seal portion is formed by a rubber-like elastic material and arranged on the inner peripheral end portion of the cancel plate, even in the case that the BPS is affected by the small amplitude oscillation caused by the pressure fluctuation, the eccentric attachment of the cancel plate and the biased load application of the return spring, the fitting portion receives the effects and does not affect the seal lip. Accordingly, it is possible to prevent an excessive abrasion, a biased contact and the like of the seal lip, and it is possible to achieve a long service life of the inner peripheral seal portion.

Further, since the BPS in accordance with the second aspect is structured such that the slits are formed on the inner peripheral surface of the fitting portion of the inner peripheral seal portion, it is possible to prevent peeling from being generated at a time when the fitting portion of the inner peripheral seal portion arranged in the inner peripheral end portion is fitted to the cylinder.

DETAILED DESCRIPTION OF PREFERRED EMBODIMENT

A description will be given below of a preferable embodiment in accordance with the present invention with reference to the drawings.

Figure 1:
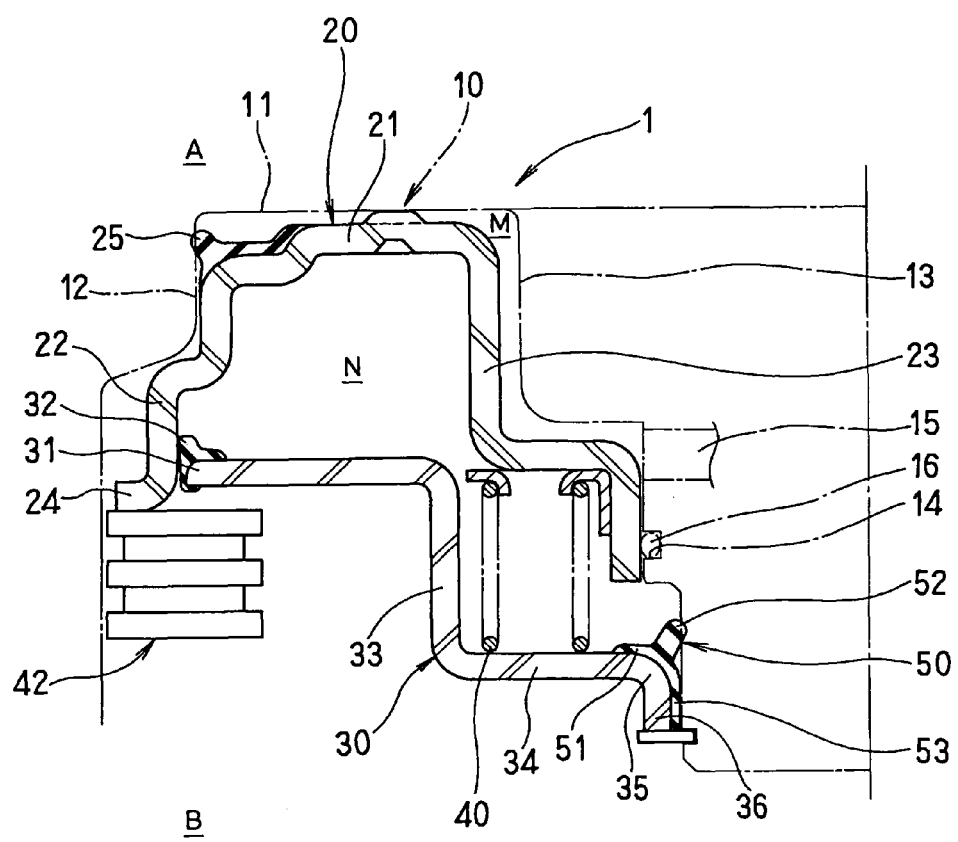
FIG. 1 is a cross sectional view of a main portion of a BPS in accordance with the present invention.
Figure 2:
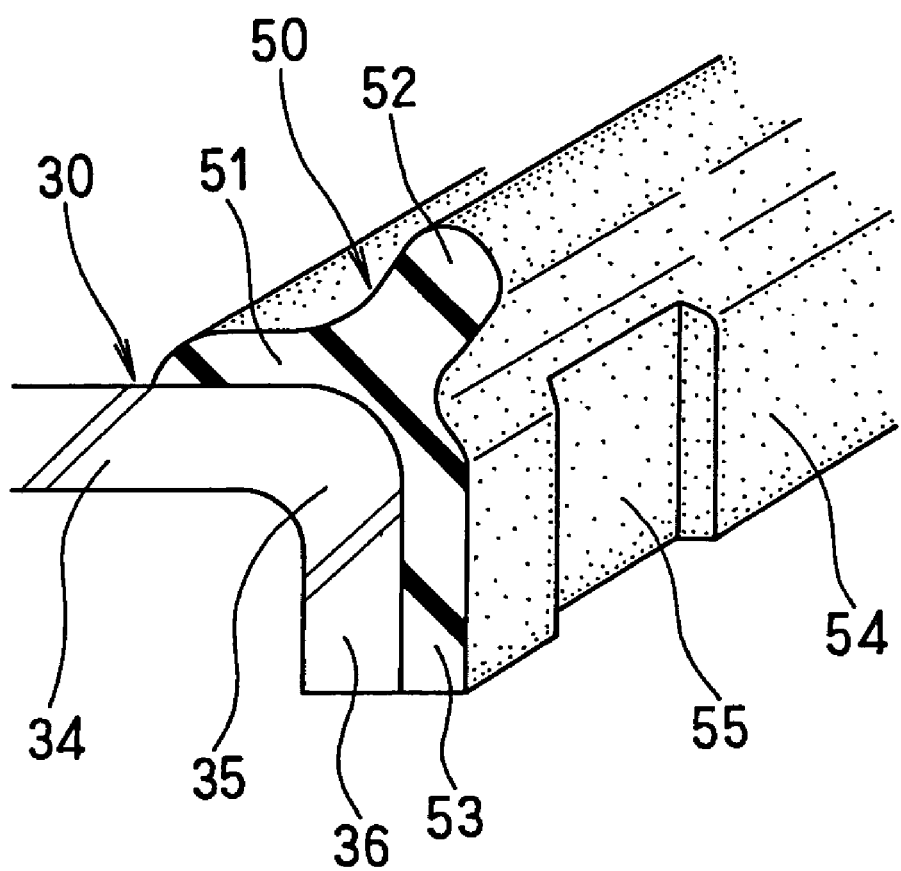
FIG. 2 is an enlarged view of an inner peripheral seal portion in FIG. 1.
Figure 3:
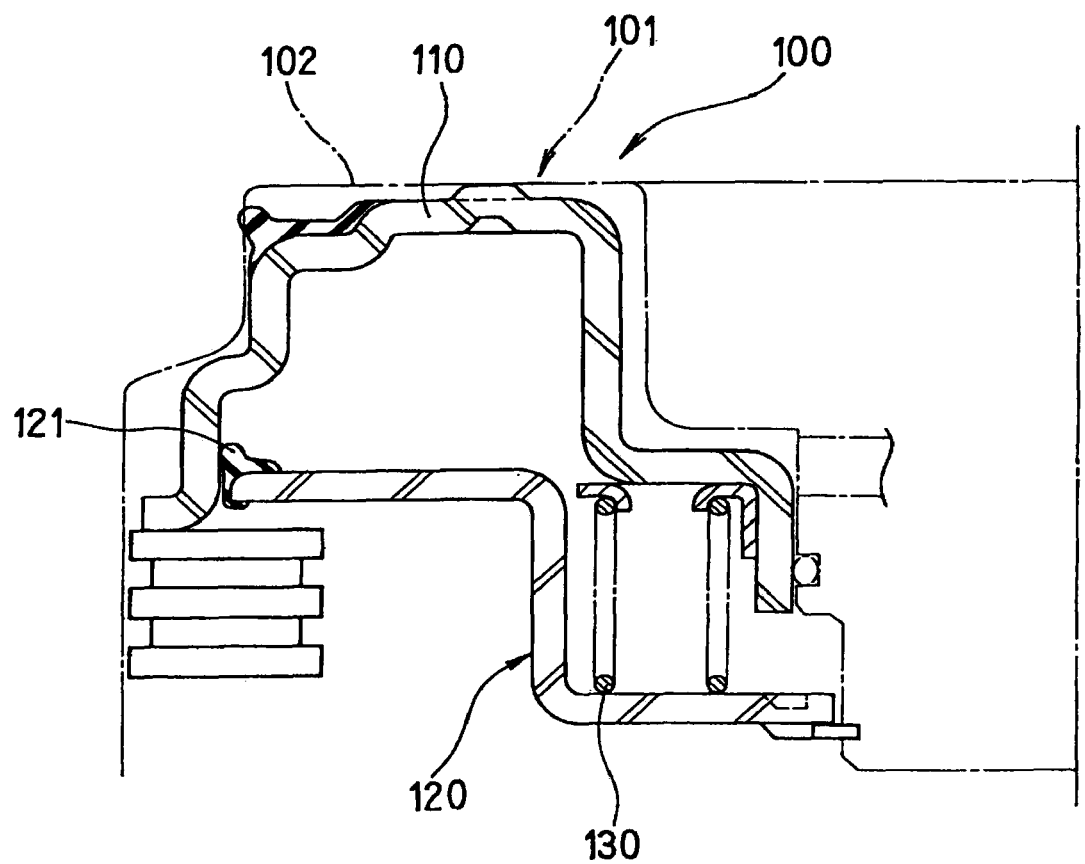
FIG. 3 is a cross sectional view of a main portion of a BPS in accordance with a prior art.
Figure 4:
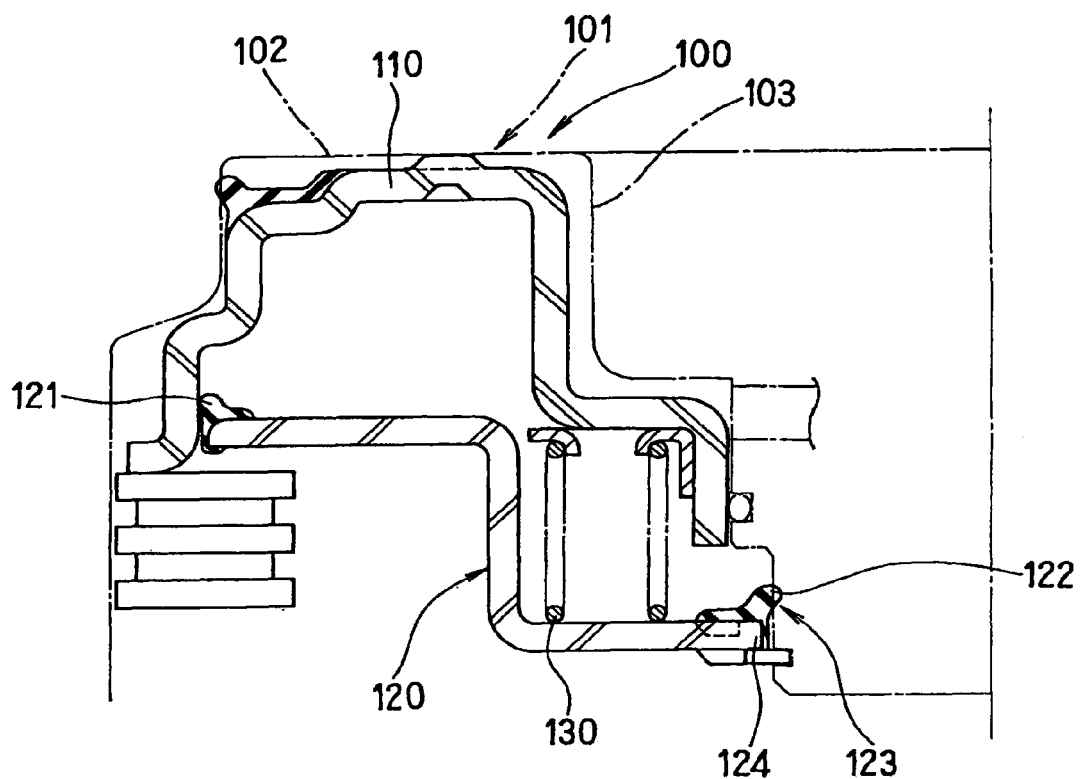
FIG. 4 is a cross sectional view of a main portion of a BPS in accordance with another prior art.

FIG. 1 is a schematic cross sectional view of a BPS in accordance with the present invention, and FIG. 2 is an enlarged view of an inner peripheral seal portion arranged in an inner peripheral end portion of a cancel plate in FIG. 1.

A BPS 1 in accordance with the present invention shown in FIG. 1 is provided with a piston member 20 which moves in an axial direction in an inner portion of a closed-end cylindrical cylinder 10 formed in an approximately C-shape and defines a compression chamber M together with the cylinder 10, a cancel plate 30 which opposes to a bottom portion 11 of the cylinder 10 while sandwiching the piston member 20 therebetween and defines a balance oil chamber N together with the piston member 20 and the cylinder 10, and a return spring 40 which functions such as to push back the piston member 20 pushed down by the compression chamber M being pressurized.

The cylinder 10 is formed in the closed-end cylindrical shape having the approximate C-shaped and is attached to a drive shaft (not shown). An installation groove 14 for installing an O-ring 16 and an oil feed port 15 for introducing working fluid to the compression chamber M are formed in an inner peripheral tube portion 13 extending in an axial direction from the other end of the bottom portion 11, to one end of which the outer peripheral tube portion 12 is coupled.

An outer peripheral tube portion 22 of the piston member 20 is structured such that the other end portion at an opposite side in an axial direction to one end portion connected to a bottom portion 21 is bent toward an outer diameter side so as to form a flange portion 24 and press a multiple disc clutch 42. Further, since an outer peripheral seal portion 25 made of a rubber-like elastic material and arranged in a corner portion between one end portion of the outer peripheral tube portion 22 of the piston member 20 and the bottom portion 21 slidably comes into close contact with the outer peripheral tube portion 12 of the cylinder 10, and an inner peripheral tube portion 23 of the piston member 20 slidably comes into close contact with the O-ring 16 installed in the installation groove 14 formed in the inner peripheral tube portion 13 of the cylinder 10, it is possible to secure a sealing performance of the compression chamber M defined by the cylinder 10 and the piston member 20.

The cancel plate 30 is obtained by simple press drawing of a metal plate such as a steel plate or the like, and is structured such that an outer peripheral seal portion 32 made of a rubber-like elastic material and slidably coming into close contact with the inner peripheral surface of the outer peripheral tube portion 22 of the piston member 20 is arranged on an outer peripheral end portion 31, a return spring 40 for making the piston member 20 move toward the bottom portion 11 side A (an upper side in the figure) of the cylinder 10 on the basis of an energizing force at a time when a hydraulic pressure in the compression chamber M is released seats on a flange portion 34 at an inner peripheral side of a center portion 33, an inner peripheral end portion 35 of the inner peripheral side flange portion 34 has a bent portion 36 which is bent toward an opposite cylinder bottom portion 11 side B (a lower side in the figure) in the axial direction, and an inner peripheral seal portion 50 is arranged on the inner peripheral end portion 35.

The inner peripheral seal portion 50 is structured such that a seal lip 52 and a fitting portion 53 are integrally formed by a rubber-like elastic material. The seal lip 52 extends to a cylinder bottom portion side A in the axial direction from a bottom portion 51 which is firmly attached to a corner portion of the inner peripheral end portion 35 of the cancel plate 30, and is in close contact with the inner peripheral tube portion 13 of the cylinder 10. The fitting portion 53 is firmly attached to the inner peripheral side surface of the bent portion 36 of the inner peripheral end portion 35, and is fitted to the outer peripheral surface of the inner peripheral tube portion 13 of the cylinder 10.

Further, a plurality of slits 55 are formed in a peripheral direction on an inner peripheral surface 54 of the fitting portion 53 fitted to the inner peripheral tube portion 13 of the cylinder 10.

Accordingly, since the BPS 1 having the structure mentioned above is structured such that the outer peripheral seal portion 32 is arranged on the outer peripheral end portion 31 of the cancel plate 30, and the inner peripheral seal portion 50 is arranged on the inner peripheral end portion 35, it is possible to increase a centrifugal pressure of the balance oil chamber N, it is possible to effectively cancel a centrifugal hydraulic pressure of the compression chamber M at a time of canceling the coupling of the clutch, and it is possible to improve a shift response or the like.

Further, since the inner peripheral seal portion 50 is provided with the fitting portion 53 firmly attached to the inner peripheral surface of the bent portion 36 together with the seal lip 52, the fitting portion 53 is fitted to the inner peripheral tube portion 13 of the cylinder 10, receives effects of the small amplitude oscillation caused by the pressure fluctuation, the eccentric attachment of the cancel plate 30 and the biased load application of the return spring 40 even if the effects are applied, and does not affect the seal lip 52. Accordingly, it is possible to prevent an excessive abrasion and a biased contact of the seal lip 52, and it is possible to achieve a long service life of the inner peripheral seal portion 50.

Further, since the slits 55 are formed on the inner peripheral surface 54 in the peripheral direction, in the fitting portion 53, it is possible to prevent peeling generated at a time when the fitting portion 53 is fitted to the inner peripheral tube portion 13 of the cylinder 10. In the meantime, although the description is given of the case that the slits 55 are formed, needless to say, it is possible to achieve a long service life of the inner peripheral seal portion 50 even in the case that the slits 55 are not formed.

What is claimed is:

1. A piston for an automatic transmission comprising:
  a piston member moving in an axial direction in an inner portion of a closed-end cylindrical cylinder and defining a compression chamber together with said cylinder;
  a cancel plate opposing a bottom portion of said cylinder beyond said piston member and defining a balance oil chamber together with said piston member and said cylinder;

a return spring adapted to push back said piston member which is pushed down by said compression chamber being pressurized; and an inner peripheral seal portion arranged on an inner peripheral end portion of said cancel plate and formed by a rubber-like elastic material, said inner peripheral seal portion including a seal lip which is in close contact with an inner peripheral tube portion of said cylinder, and a fitting portion fitted to said inner peripheral tube portion of said cylinder.

2. The piston for an automatic transmission as claimed in claim 1, wherein slits are formed on an inner peripheral surface of the fitting portion of said inner peripheral seal portion.

* * * * *